United States Patent
Wang et al.

(10) Patent No.: US 11,435,906 B2
(45) Date of Patent: Sep. 6, 2022

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Xingshan Wang, Shanghai (CN); Ao Sun, Shanghai (CN); Xiaochen Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 21 days.

(21) Appl. No.: 17/114,042

(22) Filed: Dec. 7, 2020

(65) Prior Publication Data

US 2022/0137832 A1    May 5, 2022

(30) Foreign Application Priority Data

Oct. 30, 2020  (CN) .......................... 202011196793.0

(51) Int. Cl.
  *G06F 3/06*  (2006.01)
  *G06F 11/07*  (2006.01)
  *G06F 11/30*  (2006.01)

(52) U.S. Cl.
  CPC ............ *G06F 3/0619* (2013.01); *G06F 3/067* (2013.01); *G06F 3/0659* (2013.01); *G06F 11/0772* (2013.01); *G06F 11/3034* (2013.01)

(58) Field of Classification Search
  CPC ...... G06F 3/0619; G06F 3/0659; G06F 3/067; G06F 11/0772; G06F 11/3034; G06F 9/546; G06F 2209/548
  See application file for complete search history.

(56) References Cited

U.S. PATENT DOCUMENTS

| | | | | |
|---|---|---|---|---|
| 2013/0282969 | A1* | 10/2013 | Gerhard ................ | G06F 9/3857 711/104 |
| 2020/0192728 | A1* | 6/2020 | Miranda ................. | G06F 9/542 |
| 2021/0073158 | A1* | 3/2021 | Badger ................... | G06F 9/546 |

* cited by examiner

*Primary Examiner* — Masud K Khan
(74) *Attorney, Agent, or Firm* — Amin, Turocy & Watson, LLP

(57) ABSTRACT

Embodiments of the present disclosure relate to a method, an electronic device, and a computer program product for storage management. According to an example implementation of the present disclosure, a method for storage management includes: acquiring, at a host, a target response entry from a response queue, wherein the response queue includes at least one response entry associated with at least one storage device in a storage system which has been accessed by the host, and the target response entry records information about a target response of a target storage device in the at least one storage device to an access operation initiated by the host; determining, based on the target response entry, whether a failure associated with the target response occurs; and acquiring the target response based on the target response entry if it is determined that no failure occurs. Therefore, the storage performance can be improved.

20 Claims, 6 Drawing Sheets

METHOD, ELECTRONIC DEVICE AND COMPUTER PROGRAM PRODUCT FOR STORAGE MANAGEMENT

RELATED APPLICATION

The present application claims the benefit of priority to Chinese Patent Application No. 202011196793.0, filed on Oct. 30, 2020, which application is hereby incorporated into the present application by reference herein in its entirety.

TECHNICAL FIELD

Embodiments of the present disclosure relate generally to storage management, and in particular, to a method, an electronic device, and a computer program product for storage management.

BACKGROUND

With the development of storage technologies, more and more data are stored in a storage system, leading to higher and higher requirements for the access performance of the storage system. In addition, compared with local storage systems, network-based storage systems have emerged, such as NVMEoF (Non-Volatile Memory Express over Fabrics) storage systems and SAN (Storage Area Network) storage systems. A network-based storage system allows more storage devices to be connected to a storage server by using network connections instead of local bus connections (for example, PCIe (Peripheral Component Interface Express) bus connections), thereby eliminating the need to be limited by the number of physical local bus connection slots.

However, conventionally, the host needs to poll a network completion queue corresponding to each storage device to acquire a response from the storage device. Due to the rapid expansion of a storage cluster, the polling logic must process more storage devices in each polling cycle, which means that more network completion queues need to be polled. This leads to low efficiency in processing responses of storage devices and unstable traffic bandwidth.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Embodiments of the present disclosure provide a method, an electronic device, and a computer program product for storage management.

In a first aspect of the present disclosure, a method for storage management is provided. The method includes: acquiring, at a host, a target response entry from a response queue, wherein the response queue includes at least one response entry associated with at least one storage device in a storage system which has been accessed by the host, and the target response entry records information about a target response of a target storage device in the at least one storage device to an access operation initiated by the host; determining, based on the target response entry, whether a failure associated with the target response occurs; and acquiring the target response based on the target response entry if it is determined that no failure occurs.

In a second aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions including: acquiring, at a host, a target response entry from a response queue, wherein the response queue includes at least one response entry associated with at least one storage device in a storage system which has been accessed by the host, and the target response entry records information about a target response of a target storage device in the at least one storage device to an access operation initiated by the host; determining, based on the target response entry, whether a failure associated with the target response occurs; and acquiring the target response based on the target response entry if it is determined that no failure occurs.

In a third aspect of the present disclosure, a computer program product is provided. The computer program product is tangibly stored on a non-transitory computer-readable medium and includes machine-executable instructions, wherein the machine-executable instructions, when executed, cause a machine to implement any step of the method described according to the first aspect of the present disclosure.

BRIEF DESCRIPTION OF THE DRAWINGS

The above and other objectives, features, and advantages of the present disclosure will become more apparent by describing the example embodiments of the present disclosure in more detail in combination with the accompanying drawings. In the example embodiments of the present disclosure, the same reference numerals generally represent the same parts.

In each figure, the same or corresponding reference numerals represent the same or corresponding parts.

DETAILED DESCRIPTION

Figure 1:
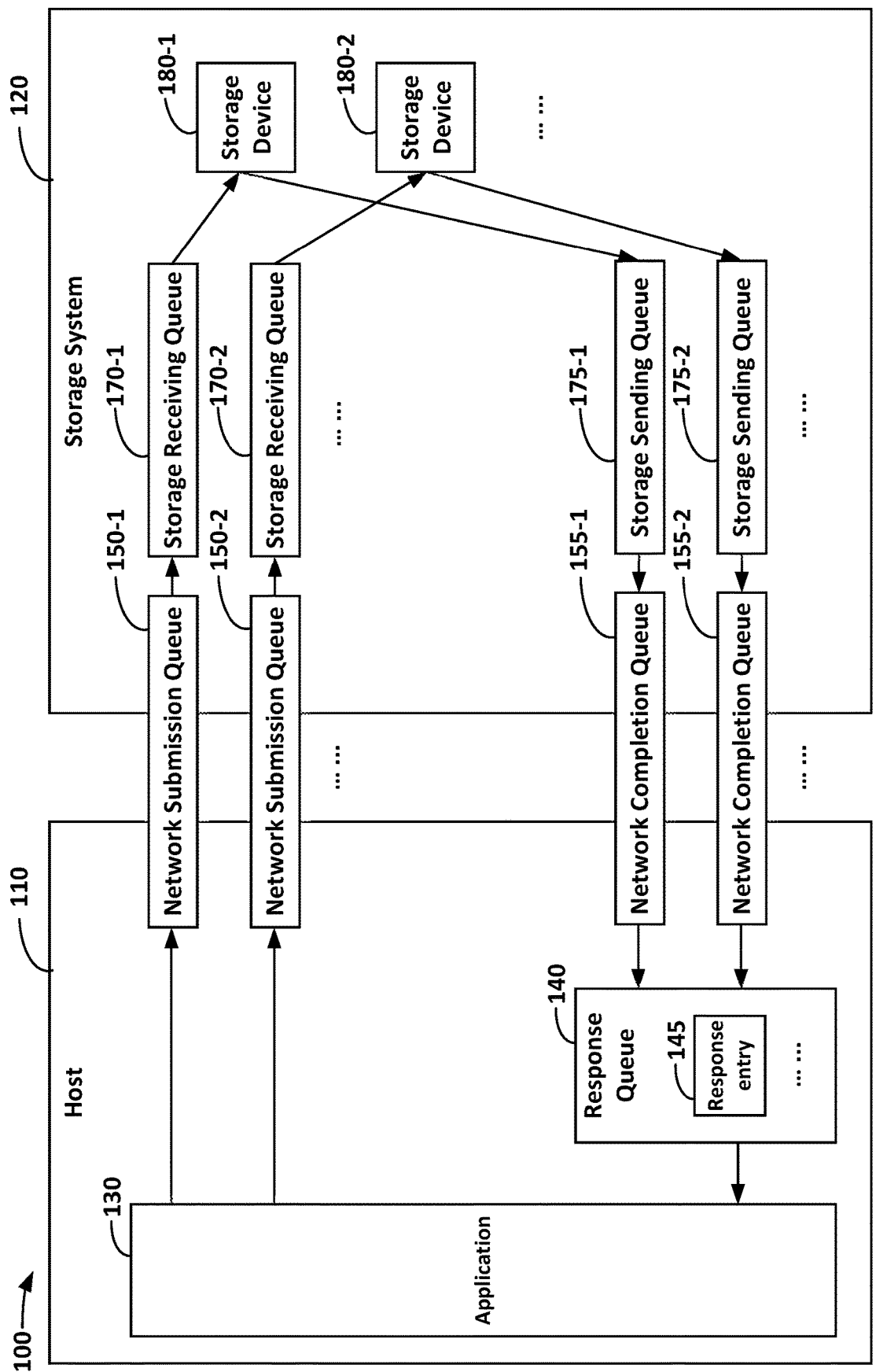
FIG. 1 illustrates a schematic diagram of an example of a storage environment in which some embodiments of the present disclosure can be implemented.

Hereinafter, preferred embodiments of the present disclosure will be described in more detail with reference to the accompanying drawings. Although the preferred embodiments of the present disclosure are shown in the drawings, it should be understood that the present disclosure can be implemented in various forms and should not be limited by the embodiments set forth herein. Rather, these embodiments are provided so that the present disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," etc., may refer to different or the same objects. Other explicit and implicit definitions may also be included below.

As mentioned above, in a conventional network-based storage system, the host is less efficient at processing responses of storage devices, and the traffic bandwidth is unstable. Specifically, a network queue is defined as a unidirectional communication channel used to transmit data between the host and the storage system. A pair of network queues consist of a network submission queue and a network completion queue. For example, the host may use the network submission queue to send a request to the storage system (more specifically, a storage device), and the storage system may use the network completion queue to send a response to the host.

The host may usually process the response from the storage device in two approaches: an interrupt-based approach and a polling-based approach. In the polling-based approach, the host (more specifically, an application executed on the host) can acquire an overall view of all storage devices in the storage cluster. Each storage device corresponds to one network completion queue. In the design of the polling strategy for network completion queues, a separate polling context is provided for each storage device, and this polling strategy involves excessive context switching and idle polling. As the storage cluster scales up, the number of storage devices in one storage cluster may be in the thousands, and thus the impact on the polling efficiency for network completion queues will become more significant. These adverse effects may include, for example, polling context switching overhead, empty polling, consumption of storage resources, and so on.

For the polling context switching overhead, the host needs to traverse all network completion queues corresponding to all storage devices in each poll, which will result in the high cost of frequent context switching in the I/O (input/output) path.

For the empty polling, in each poll, not all storage devices have completed an access operation and sent a response, so it is not necessary to poll the network completion queue corresponding to such a storage device. However, conventionally, it is impossible to determine whether a storage device has completed an access operation, and thus empty polling occurs.

For the consumption of storage resources, conventionally, a certain storage space (for example, 1 KB) is allocated to each storage device to store a response entry that records information about the response sent by the storage device. If the storage cluster scales up, the allocated storage space will also increase. Most of these storage spaces are not used in the entire application life cycle, thus wasting storage resources.

According to an example embodiment of the present disclosure, an improved solution for storage management is proposed. This solution includes: acquiring, at a host, a target response entry from a response queue, wherein the response queue includes at least one response entry associated with at least one storage device in a storage system which has been accessed by the host, and the target response entry records information about a target response of a target storage device in the at least one storage device to an access operation initiated by the host; determining, based on the target response entry, whether a failure associated with the target response occurs; and acquiring the target response based on the target response entry if it is determined that no failure occurs.

In this way, in this solution, one response queue will cover multiple storage devices in the storage cluster, so there is no need to sequentially poll the network completion queue corresponding to each storage device. As a result, the polling efficiency, the access performance in the I/O path, and the stability of traffic bandwidth can be improved. The embodiments of the present disclosure will be specifically described below with reference to the accompanying drawings.

FIG. 1 illustrates a schematic diagram of an example of storage environment 100 in which some embodiments of the present disclosure can be implemented. Storage environment 100 includes host 110 and storage system 120. Storage system 120 may be a network-based storage system, such as an NVMEoF storage system, a SAN storage system, and the like. Storage system 120 includes multiple storage devices (for example, storage devices 180-1 and 180-2, which are collectively referred to as "storage device 180" below). Each storage device is managed by one storage device controller (not shown).

Application 130 may be run on host 110. Application 130 may initiate an access operation for storage device 180 via a pair of network queues. As mentioned above, the network queue is defined as a unidirectional communication channel used to transmit data between host 110 and storage system 120. The network queues may support various network protocols, such as the RDMA (Remote Direct Memory Access) protocol, the TCP (Transmission Control Protocol) protocol, and the optical fiber network.

A pair of network queues consists of a network submission queue (for example, network submission queues 150-1 and 150-2, which are collectively referred to as "network submission queue 150" below) and a network completion queue (for example, network completion queues 155-1 and 155-2, which are collectively referred to as "network completion queue 155" below). For example, network submission queue 150-1 and network completion queue 155-1 may form a pair of network queues, and network submission queue 150-2 and network completion queue 155-2 may form a pair of network queues.

In addition, each storage device 180 has a pair of storage queues. A pair of storage queues consists of a storage receiving queue (for example, storage receiving queues 170-1 and 170-2, which are collectively referred to as "storage receiving queue 170" below) and a storage sending queue (storage sending queues 175-1 and 175-2, which are collectively referred to as "storage sending queue 175" below). For example, storage device 180-1 is provided with storage receiving queue 170-1 and storage sending queue 175-1, and storage device 180-2 is provided with storage receiving queue 170-2 and storage sending queue 175-2.

Each pair of storage queues corresponds to a pair of network queues. For example, storage receiving queue 170-1 and storage sending queue 175-1 correspond to network submission queue 150-1 and network completion queue 155-1, and storage receiving queue 170-2 and storage sending queue 175-2 correspond to network submission queue 150-2 and network completion queue 155-2. Thus, a data transmission channel between application 130 and the corresponding storage device 180 is formed.

For example, host 110 (more specifically, application 130 of host 110) may possibly wish to store a photo into storage system 120 (more specifically, storage device 180 in storage system 120) through the network. In this case, application 130 may send, to storage device 180 via network submission queue 150, a request related to the access operation for storing the photo. At storage system 120, requests received via network submission queue 150 can enter storage receiving queue 170 in order to be processed by the storage controller or its storage device 180. After storage device 180 stores the photo, storage device 180 or its storage controller places a response for the requested access operation into storage sending queue 175 in order to be sent to host 110 via network completion queue 155.

At host 110, after the response is received via network completion queue 155, a response entry (e.g., response entry 145) that records information about this response will be generated, and this response entry 145 will be placed into response queue 140. Thus, application 130 may acquire response entry 145 from response queue 140, and acquire the response based on response entry 145, thereby determining the status of the access operation, for example, whether the photo is successfully stored.

In fact, response queue 140 may include response entries associated with multiple storage devices 180. In some embodiments, response queue 140 may include response entries associated with storage device 180 that host 110 has accessed. Therefore, when host 110 intends to acquire a response, host 110 does not need to poll network completion queue 155 corresponding to each storage device 180. For example, host 110 does not need to sequentially poll network completion queue 155-1 corresponding to storage device 180-1 and network completion queue 155-2 corresponding to storage device 180-2. In contrast, host 110 only needs to acquire response entry 145 from response queue 140 shared by the multiple storage devices 180 in order to acquire the response. In this way, the polling context switching overhead, the probability of empty polling, and the consumption of storage resources will be significantly reduced, thereby improving the polling efficiency, the access performance in the I/O path, and the stability of traffic bandwidth.

It should be understood that the numbers of network submission queues, network completion queues, storage receiving queues, storage sending queues, storage devices, and response entries shown in FIG. 1 are only examples. In fact, the numbers of these entities may be more or less.

Figure 2:
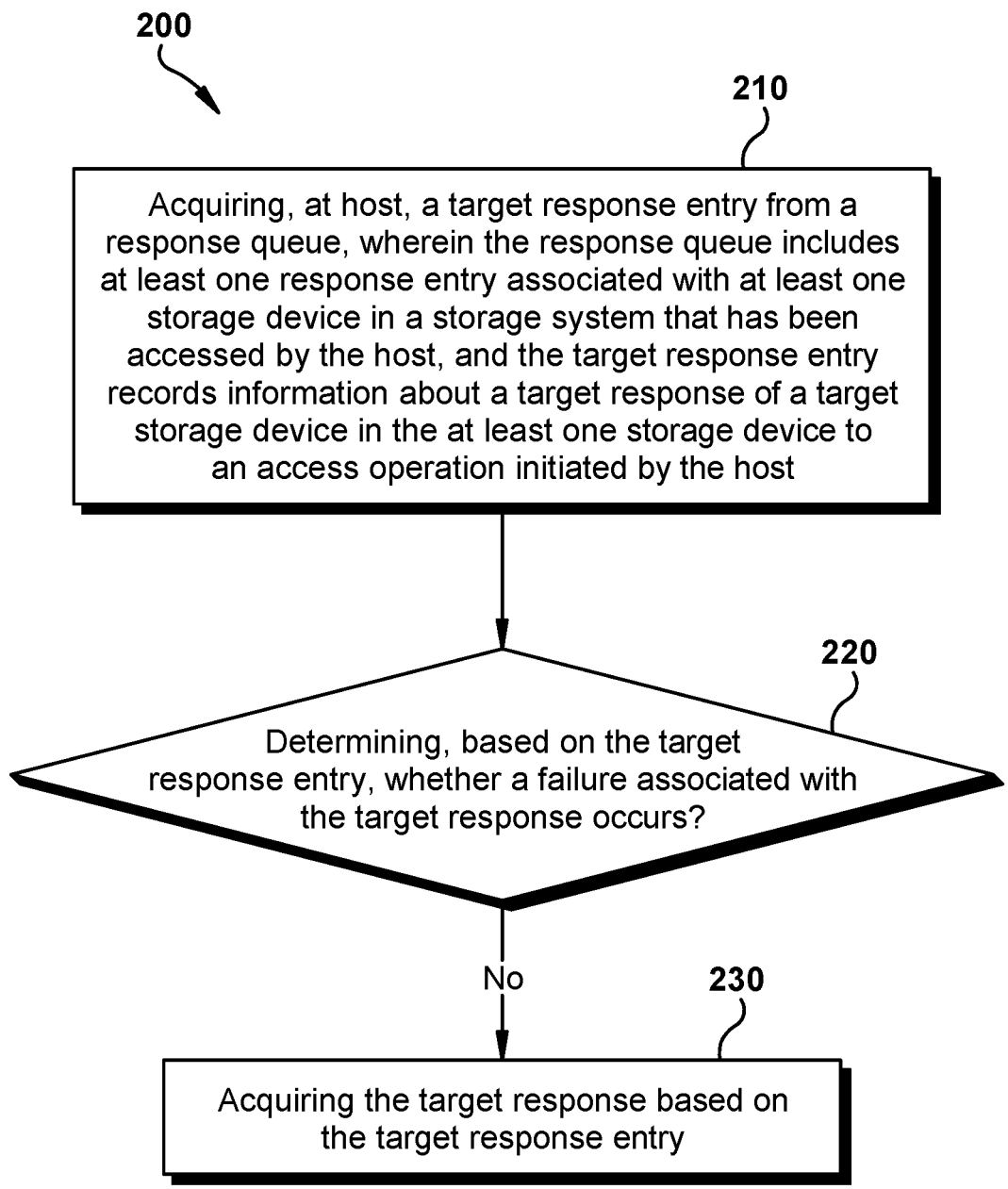
FIG. 2 illustrates a flowchart of an example of a method for storage management according to some embodiments of the present disclosure.

FIG. 2 illustrates a flowchart of method 200 for storage management according to some embodiments of the present disclosure. Method 200 may be implemented by host 110 as shown in FIG. 1. Alternatively, method 200 may also be implemented by other entities besides host 110. It should be understood that method 200 may further include additional steps that are not shown and/or may omit the shown steps, and the scope of the present disclosure is not limited in this aspect.

At 210, host 110 acquires a target response entry (e.g., response entry 145) from response queue 140. Response queue 140 includes response entries associated with storage device 180 that is in storage system 120 and that host 110 has accessed. Target response entry 145 records information about the target response of the target storage device (for example, storage device 180-1) in storage device 180 to the access operation initiated by host 110. In some embodiments, target response entry 145 may include the address at which the target response is stored in the memory of host 110.

At 220, host 110 determines, based on target response entry 145, whether a failure associated with the target response occurs. For example, the failure may include a failure of a network that transmits the target response, a failure of target storage device 180-1, a failure of storage system 120, and the like. If no failure occurs, then at 230, host 110 acquires the target response based on target response entry 145. In some embodiments, host 110 may determine, based on target response entry 145, the address at which the target response is stored in the memory. Thus, host 110 may acquire the target response from the memory based on the address. After acquiring the target response, host 110 may analyze the target response, for example, to determine whether the access operation is successful.

If a failure occurs, host 110 may create, in response to the recovery of the failure, another response queue to replace response queue 140. For example, failures of the network, target storage device 180-1, or storage system 120 may cause the response queue to be unavailable. In this case, host 110 may monitor the status of the network, target storage device 180-1 or storage system 120. Upon detecting its recovery, host 110 may create a new response queue.

Therefore, when host 110 intends to acquire a response, host 110 does not need to poll network completion queue 155 corresponding to each storage device 180. For example, host 110 does not need to sequentially poll network completion queues 155-1, 155-2, etc., but instead only needs to acquire response entry 145 from response queue 140 shared by the multiple storage devices 180 in order to acquire the response. In this way, the polling context switching overhead, the probability of empty polling, and the consumption of storage resources will be significantly reduced, thereby improving the polling efficiency, the access performance in the I/O path, and the stability of traffic bandwidth.

Figure 3:
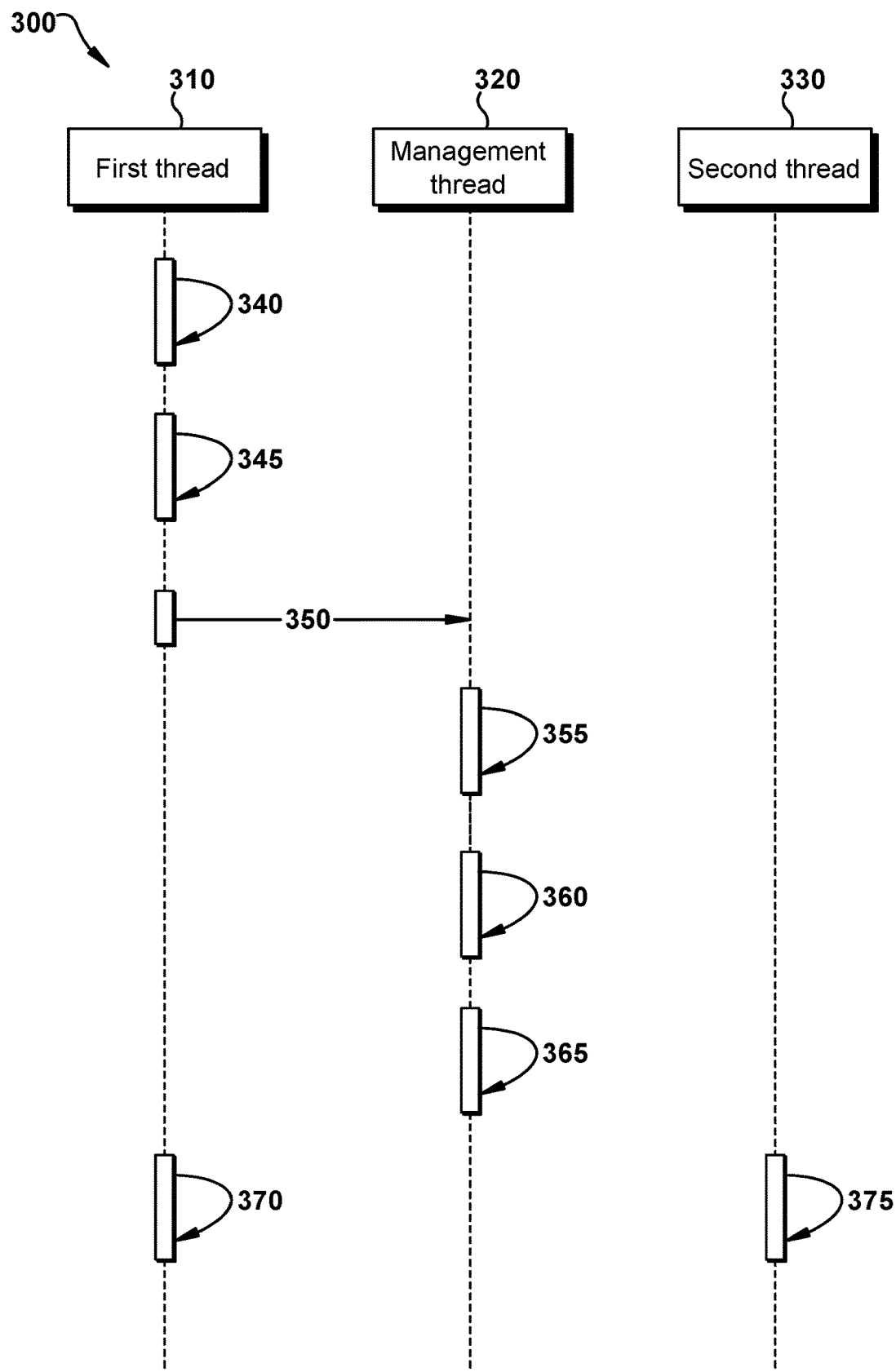
FIG. 3 illustrates a swim lane diagram of an example of a storage management process according to some embodiments of the present disclosure.

FIG. 3 illustrates a swim lane diagram of an example of storage management process 300 according to some embodiments of the present disclosure. Process 300 may be implemented by host 110 as shown in FIG. 1. Alternatively, process 300 may also be implemented by other entities besides host 110. It should be understood that process 300 may further include additional steps that are not shown and/or may omit the shown steps, and the scope of the present disclosure is not limited in this aspect.

In some embodiments, in order to further improve storage security, different response queues 140 are set for different threads on host 110. For example, the thread may be a thread initiated by application 130 executed on host 110. In this way, the response entry of one thread will not be acquired by another thread, thereby preventing data leakage or tampering. Therefore, hereinafter, process 300 will be described with a thread as the entity.

After initialization, first thread 310 may create 340 response queue 140. In addition, first thread 310 may also create 345 a queue group and associate the queue group with response queue 140. Network completion queue 155 (e.g., network completion queues 155-1 and 155-2, etc.) for receiving responses from storage device 180 (e.g., storage devices 180-1 and 180-2, etc.) will be mapped to the queue group. Since network completion queue 155 and network submission queue 150 constitute a pair of network queues, it can be considered that the pair of network queues will be mapped to this queue group. Further, since a pair of network queues corresponds to a pair of storage queues, it can also be considered that the pair of storage queues will be mapped to this queue group. Note that, at this time, no pair of network queues or storage queues have been mapped into the newly created queue group, and the mapping operation will be described below.

In some embodiments, in order to associate the queue group with response queue 140, first thread 310 may set the owner of the queue group as response queue 140. Thus, response queue 140 may be utilized to store response entry 145 corresponding to the response received by network completion queue 155 mapped to or belonging to the queue group. For example, when a response is sent from storage device 180 to host 110 via storage sending queue 175 to be mapped into the queue group and its corresponding network completion queue 155, response entry 145 of this response may be put into response queue 140 associated with this queue group.

Then, first thread 310 may notify 350 management thread 320 of host 110 that a request for access operation has been initiated. Thus, management thread 320 may create 355 the network completion queue (e.g., network completion queue 155-1) for storage device (e.g., storage device 180-1) targeted by this request, so as to be used for receiving the response from storage device 180-1. In some embodiments, management thread 320 may create a pair of network queues (e.g., network submission queue 150-1 and network completion queue 155-1) and a pair of storage queues (e.g., storage receiving queue 170-1 and storage sending queue 175-1) corresponding to storage device 180-1.

In addition, management thread 320 may associate 360 network completion queue 155-1 with storage sending queue 175-1, for example, mapping network completion queue 155-1 to storage sending queue 175-1. In some embodiments, management thread 320 may map a pair of network queues (e.g., network submission queue 150-1 and network completion queue 155-1) to a pair of storage queues (e.g., storage receiving queue 170-1 and storage sending queue 175-1).

Further, management thread 302 may map 365 network completion queue 155-1 to the queue group. In some embodiments, management thread 320 may map a pair of network queues (e.g., network submission queue 150-1 and network completion queue 155-1) to the queue group. Since this pair of network queues correspond to a pair of storage queues (i.e., storage receiving queue 170-1 and storage sending queue 175-1) for storage device 180-1, this pair of storage queues are also mapped to the queue group.

In addition, in addition to performing the above operations for first thread 310, management thread 320 may also perform similar operations for other threads (e.g., second thread 320). In some embodiments, in the situation where first thread 310 notifies management thread 320 that the request for access operation has been initiated, management thread 320 may also map a pair of storage queues and a pair of network queues corresponding to storage device 180-1 to other queue groups created for other threads. In some embodiments, management thread 320 may also first create, for other threads, a pair of other storage queues and a pair of other network queues corresponding to storage device 180-1, and then map the created pair of other storage queues and pair of other network queues to other queue groups. In this way, other threads may also acquire response entries from other response queues that are associated with other queue groups and created for other threads. It should be understood that although only one other thread is shown in FIG. 3, the number of threads may be more or less.

Then, in the case where host 110 receives a response from network completion queue 155, host 110 may create a response entry (e.g., response entry 145) based on this response, and place response entry 145 into response queue 140. In this case, host 110 may poll response queue 140 to acquire response entry 145 from response queue 140, in order to acquire the response. For example, first thread 310 may poll 370 response queue 140 to acquire response entry 145 from response queue 140, in order to acquire the response. Similarly, second thread 330 may also poll 375 response queue 140 to acquire response entry 145 from response queue 140, in order to acquire the response. The operation of acquiring the response has been described in detail in FIG. 2, so its description is omitted here.

Figure 4A:
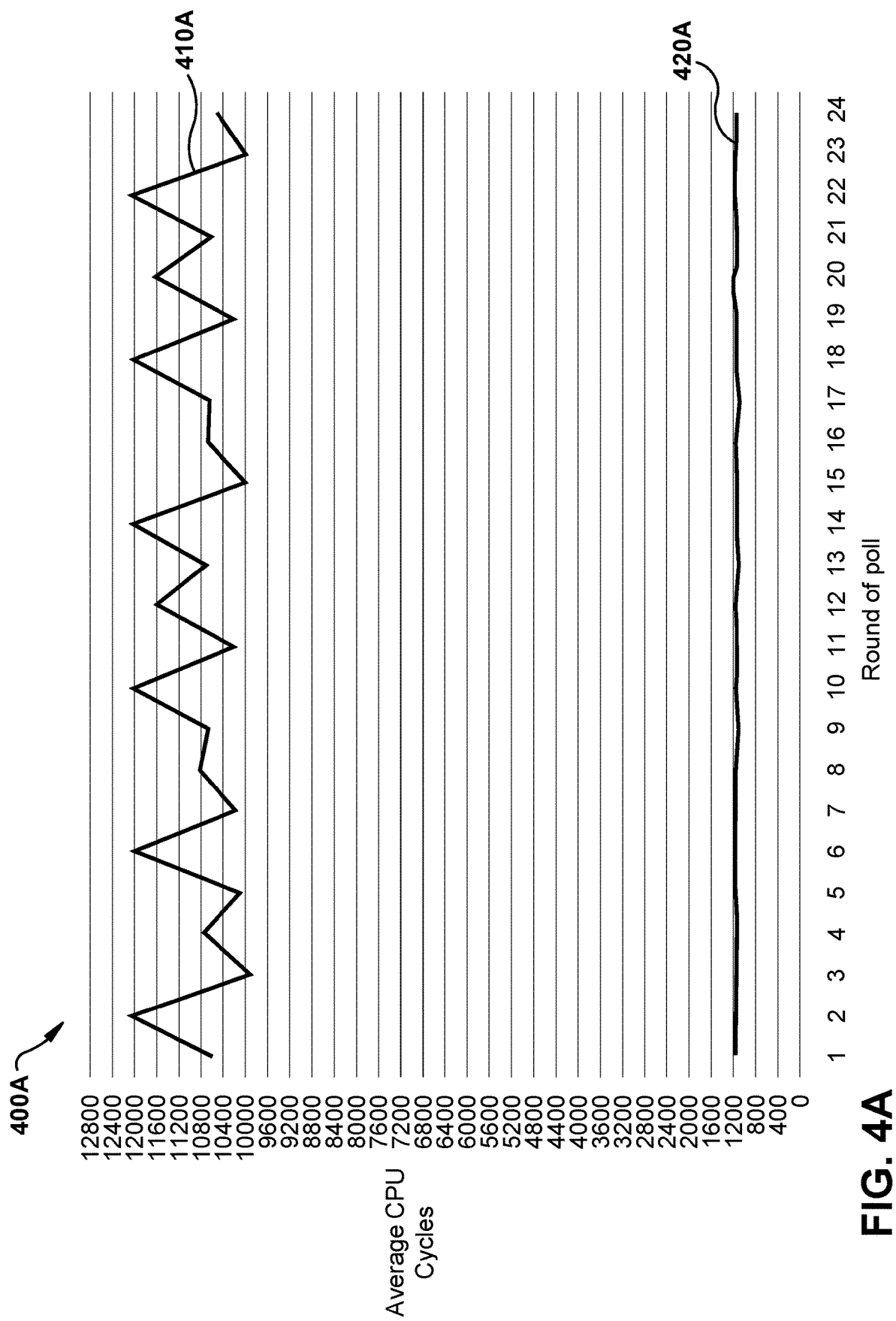
FIGS. 4A and 4B illustrate schematic diagrams of an example of performance comparison between a storage management process according to some embodiments of the present disclosure and a conventional storage management process.
Figure 4B:
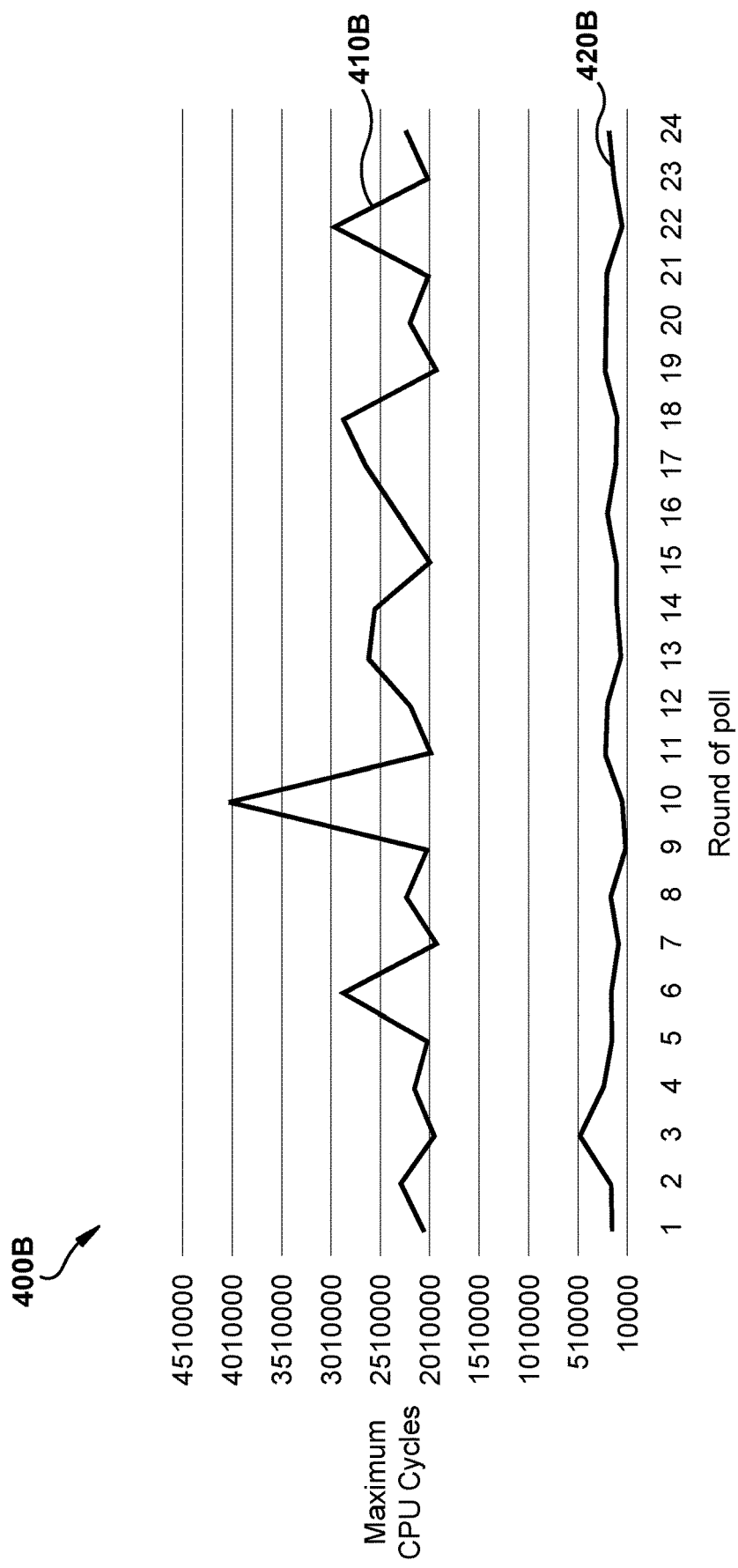

FIGS. 4A and 4B illustrate schematic diagrams 400A and 400B of an example of performance comparison between a storage management process according to some embodiments of the present disclosure and a conventional storage management process. In FIG. 4A, line 410A indicates the average CPU (central processing unit) cycles conventionally consumed per poll, and line 420A indicates the average CPU cycles consumed per poll in this solution. In FIG. 4B, line 410B indicates the maximum CPU cycles conventionally consumed per poll, and line 420B indicates the maximum CPU cycles consumed per poll in this solution. Apparently, compared with the conventional storage management process, the storage management process according to some embodiments of the present disclosure significantly reduces the consumption of resources.

Figure 5:
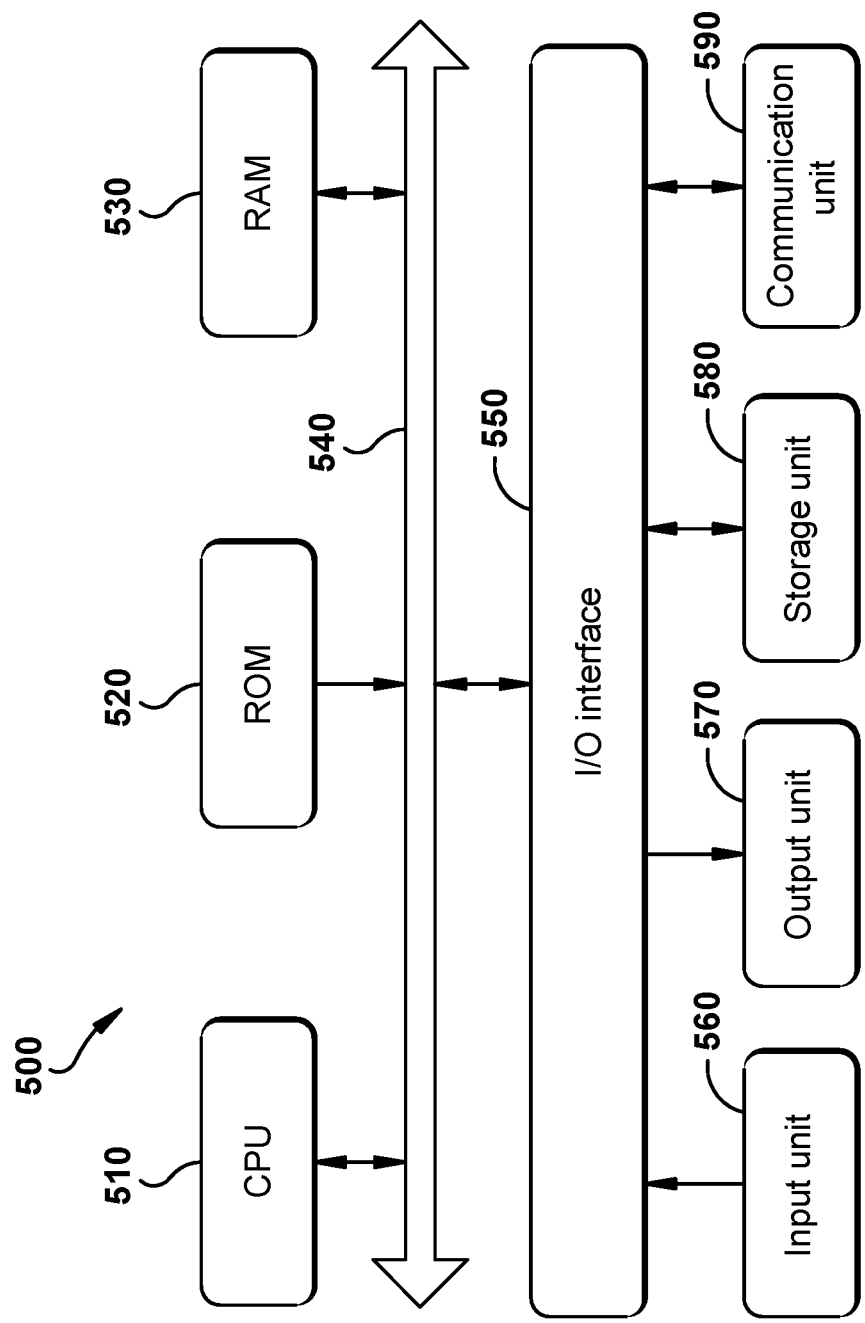
FIG. 5 illustrates a schematic block diagram of an example device that can be used to implement embodiments of the present disclosure.

FIG. 5 illustrates a schematic block diagram of example device 500 that can be used to implement the embodiments of the content of the present disclosure. For example, host 110 as shown in FIG. 1 may be implemented by device 500. As shown in the drawing, device 500 includes central processing unit (CPU) 510 that may perform various appropriate actions and processing according to computer program instructions stored in read-only memory (ROM) 520 or computer program instructions loaded from storage unit 580 into random access memory (RAM) 530. In RAM 530, various programs and data required for the operation of device 500 may also be stored. CPU 510, ROM 520, and RAM 530 are connected to each other through bus 540. Input/output (I/O) interface 550 is also connected to bus 540.

Multiple components in device 500 are connected to I/O interface 550, including: input unit 560, such as a keyboard or a mouse; output unit 570, such as various types of displays or speakers; storage unit 580, such as a magnetic disk or an optical disk; and communication unit 590, such as a network card, a modem, or a wireless communication transceiver. Communication unit 590 allows device 500 to exchange information/data with other devices over a computer network such as the Internet and/or various telecommunication networks.

The various processes and processing described above, such as processes 200 and 300, may be executed by processing unit 510. For example, in some embodiments, processes 200 and 300 may be implemented as a computer software program that is tangibly included in a machine-readable medium, for example, storage unit 580. In some embodiments, part or all of the computer program may be loaded and/or mounted to device 500 via ROM 520 and/or communication unit 590. When the computer program is loaded into RAM 530 and executed by CPU 510, one or more actions of processes 200 and 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to embodiments of the present disclosure. It should be understood that each block in the flowcharts and/or block diagrams and a combination of blocks in the flowcharts and/or block diagrams may be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the various embodiments disclosed herein.

What is claimed is:

1. A method, comprising:
acquiring, at a host comprising a processor, a target response entry from a response queue associated with a group of storage devices comprising a storage device associated with a network completion queue and a target storage device associated with a target network completion queue, wherein the response queue comprises at least one response entry associated with the group of storage devices in a storage system that has been accessed by the host, wherein the at least one response entry comprises the target response entry, wherein the target response entry records information about a target response of the target storage device to an access operation initiated by the host, and wherein the acquiring of the target response entry is performed without polling the network completion queue and the target network completion queue;
based on the target response entry, determining whether a failure associated with the target response occurs; and
in response to determining that the failure has not occurred, acquiring the target response based on the target response entry.

2. The method according to claim 1, wherein the failure comprises at least one of:
a failure of a network that transmits the target response,
a failure of the target storage device, or
a failure of the storage system.

3. The method according to claim 1, further comprising:
in response to determining that the failure has occurred, creating, in response to recovery of the failure, another response queue to replace the response queue.

4. The method according to claim 1, wherein the acquiring of the target response based on the target response entry comprises:
based on the target response entry, determining an address at which the target response is stored in a memory; and
acquiring the target response from the memory based on the address.

5. The method according to claim 1, further comprising:
creating the response queue;
creating a queue group, wherein a group of network completion queues for receiving a response from the group of storage devices is mapped to the queue group, wherein the response is the target response or a different response, and wherein the group of network completion queues comprises the network completion queue and the target network completion queue; and
associating the queue group with the response queue to use the response queue to store a response entry corresponding to the response received by the group of network completion queues, wherein the response entry is the target response entry or a different response entry.

6. The method according to claim 5, further comprising:
in response to the host initiating an access operation for the group of storage devices, creating the group of network completion queues for the receiving of the response from the group of storage devices; and
mapping the group of network completion queues to the queue group.

7. The method according to claim 6, wherein the target network completion queue is able to receive the target response from the target storage device, and wherein the method further comprises:
receiving the target response from the target network completion queue;
creating the target response entry based on the target response; and
placing the target response entry into the response queue.

8. A device, comprising:
at least one processing unit; and
at least one memory which is coupled to the at least one processing unit and stores instructions for execution by the at least one processing unit, wherein the instructions, when executed by the at least one processing unit, cause the device to perform operations, comprising:
acquiring, at a host of the device, a target response entry from a response queue associated with a group of storage devices comprising a storage device associated with a network completion queue and a target storage device associated with a target network completion queue, wherein the response queue comprises at least one response entry associated with the group of storage devices in a storage system that has been accessed by the host, wherein the at least one response entry comprises the target response entry, wherein the target response entry records information about a target response of the target storage device to an access operation initiated by the host, and wherein the acquiring of the target response entry is performed without polling the network completion queue and the target network completion queue;
determining, based on the target response entry, whether a failure associated with the target response occurs; and
based on determining that the failure has not occurred, acquiring the target response based on the target response entry.

9. The device according to claim 8, wherein the failure comprises at least one of the following:
a failure of a network that transmits the target response,
a failure of the target storage device, and
a failure of the storage system.

10. The device according to claim 8, wherein the operations further comprise:
based on determining that the failure has occurred, creating, in response to recovery of the failure, another response queue to replace the response queue.

11. The device according to claim 8, wherein the acquiring of the target response based on the target response entry comprises:
based on the target response entry, determining an address at which the target response is stored in a memory; and
acquiring the target response from the memory based on the address.

12. The device according to claim 8, wherein the operations further comprise:
creating the response queue;
creating a queue group, wherein a group of network completion queues for receiving a response from the group of storage devices is mapped to the queue group, wherein the response is the target response or a different response, and wherein the group of network completion queues comprises the network completion queue and the target network completion queue; and associating the queue group with the response queue to use the response queue to store a response entry corresponding to the response received by the group of network completion queues, wherein the response entry is the target response entry or a different response entry.

13. The device according to claim 12, wherein the operations further comprise:
in response to the host initiating an access operation for the group of storage devices, creating the group of network completion queues for the receiving of the response from the group of storage devices; and
mapping the group of network completion queues to the queue group.

14. The device according to claim 13, wherein the target network completion queue is able to receive the target response from the target storage device, and wherein the operations further comprise:
receiving the target response from the target network completion queue;
creating the target response entry based on the target response; and
placing the target response entry into the response queue.

15. A non-transitory computer program product stored on a non-transitory computer-readable medium and comprising machine-executable instructions, wherein the machine-executable instructions, when executed, cause a machine to perform operations, comprising:
acquiring a target response entry from a response queue associated with a group of storage devices comprising a storage device associated with a network completion queue and a target storage device associated with a target network completion queue, wherein the response queue comprises at least one response entry associated with the group of storage devices in a storage system that has been accessed by a host of the machine, wherein the at least one response entry comprises the target response entry, wherein the target response entry records information about a target response of the target storage device to an access operation initiated by the host, and wherein the acquiring of the target response entry is performed without polling the network completion queue and the target network completion queue;
based on the target response entry, determining whether a failure associated with the target response occurs; and
in response to determining that the failure has not occurred, acquiring the target response based on the target response entry.

16. The non-transitory computer program product according to claim 15, wherein the failure comprises at least one of the following:
a failure of a network that transmits the target response,
a failure of the target storage device, and
a failure of the storage system.

17. The non-transitory computer program product according to claim 15, wherein the operations further comprise:
in response to determining that the failure has occurred, creating, in response to recovery of the failure, another response queue to replace the response queue.

18. The non-transitory computer program product according to claim 15, wherein the acquiring of the target response based on the target response entry comprises:
based on the target response entry, determining an address at which the target response is stored in a memory; and
acquiring the target response from the memory based on the address.

19. The non-transitory computer program product according to claim 15, wherein the operations further comprise:
creating the response queue;
in response to the host initiating an access operation for the at least one storage device, creating a group of network completion queues for receiving a response from the group of storage devices, wherein the response is the target response or a different response, and wherein the group of network completion queues comprises the network completion queue and the target network completion queue;
creating a queue group;
associating the queue group with the response queue to use the response queue to store a response entry corresponding to the response received by the group of network completion queues, wherein the response entry is the target response entry or a different response entry; and
mapping the group of network completion queues to the queue group.

20. The non-transitory computer program product according to claim 19, wherein the target network completion queue is able to receive the target response from the target storage device, and wherein the operations further comprise:
receiving the target response from the target network completion queue;
creating the target response entry based on the target response; and
placing the target response entry into the response queue.

* * * * *